J. P. LAJOIE.
APPARATUS FOR THE PURIFICATION OF WATER.
APPLICATION FILED SEPT. 18, 1908.
948,785.
Patented Feb. 8, 1910.
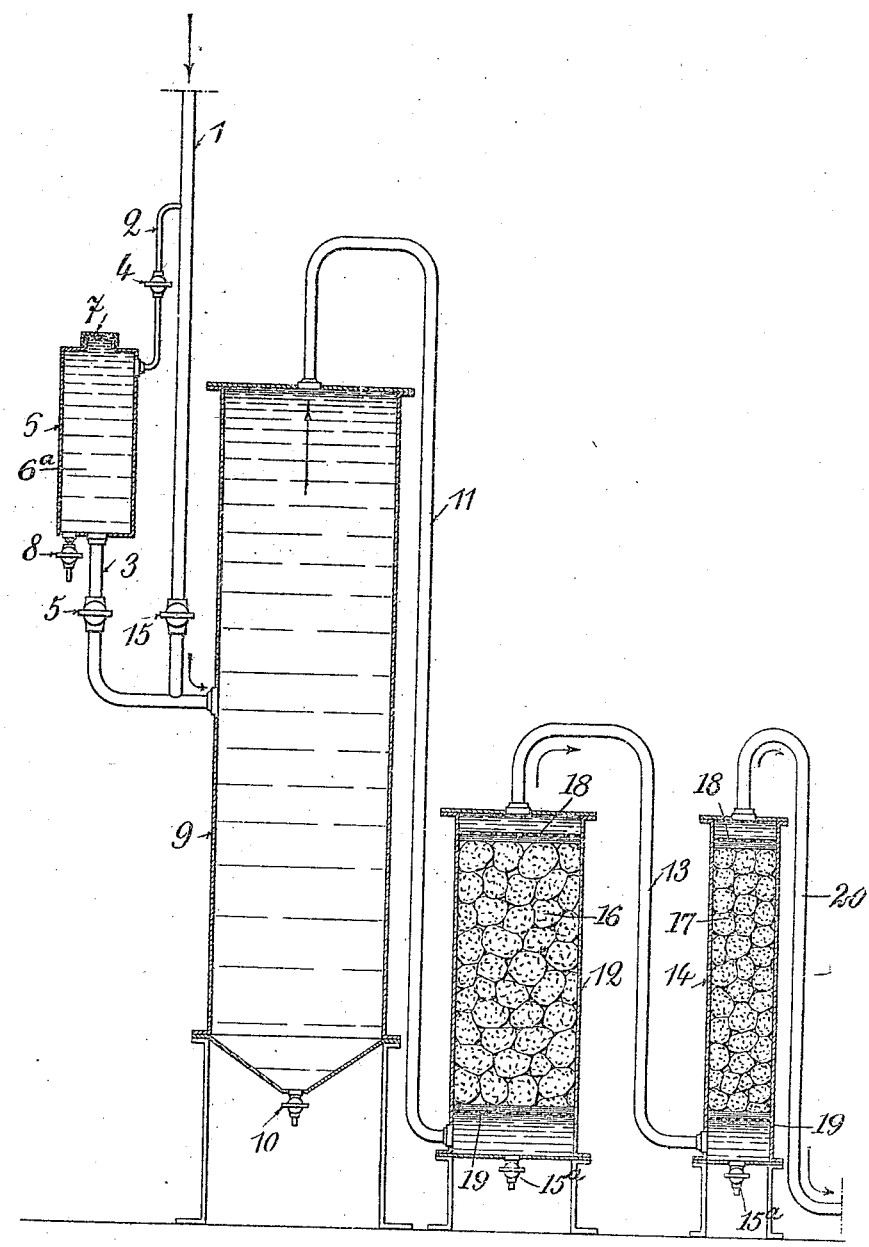
WITNESSES
W. M. Avery
J. P. Davis
INVENTOR
Jules Paul Lajoie
BY
ATTORNEYS

UNITED STATES PATENT OFFICE.

JULES PAUL LAJOIE, OF TAVERNY, FRANCE.

APPARATUS FOR THE PURIFICATION OF WATER.

948,785.         Specification of Letters Patent.         Patented Feb. 8, 1910.

Application filed September 18, 1908. Serial No. 453,687.

*To all whom it may concern:*

Be it known that I, JULES PAUL LAJOIE, a citizen of the Republic of France, residing at Taverny, Avenue Delarivière, Seine, and Oise, in the Republic of France, engineer, have invented certain new and useful Improvements in Apparatus for the Purification of Water, of which the following is a specification.

My invention relates to mechanism for purifying water used for various purposes, and especially for manufacturing, my more particular purpose being to rid water of calcareous matter and various salts which might otherwise coat the interior of boilers.

Up to the present time the purification of water for the purposes indicated has generally been attended with some difficulty. It has been customary in purifying water, to first introduce suitable reagents for the purpose of forming together with the impurities, soluble salts which are slowly precipitated. The apparatus used for this purpose however, is very cumbersome and expensive, uncertain in operation, and difficult to maintain in good order.

In my improved apparatus I provide for the use of a slowly soluble reagent, which I employ to precipitate the calcareous salts contained in the water, this result being usually accomplished in a very short time, after which the purification is rendered comparatively easy, so that an apparatus of small size and few parts will suffice to finish the purifying operation. Moreover, this enables the water to be passed quickly, under pressure, through the apparatus.

Generally summarized, my improved mechanism comprises a receptacle for holding a reagent, this receptacle being connected as a by-path to the main pipe, through which water is carried under pressure, so that the reagent contained within the receptacle slowly dissolves and enters the water of the main pipe; this water next passing into a decanting receptacle, and from the latter passes, still under pressure, through a series of separate vessels containing materials which still further purify the water. The water is not released from pressure until finally discharged from the last receptacle of the series.

In connection with my improved apparatus I employ a pump or equivalent member for the purpose of moving water through the system and meanwhile keeping the water under pressure as it travels. The pump has only to be started and stopped at proper intervals, though the action of the apparatus as a whole is continuous in so far as its effect upon the flowing water is concerned.

In the use of my apparatus, the operator need pay but little attention to any of the mechanism, as a few moments of his time for each week is sufficient to keep the apparatus in constant operation.

Reference is to be had to the accompanying drawing forming a part of this specification in which a vertical section of the improvement is shown.

At 1 is a pipe through which passes the water to be purified; at 2—3 are pipes which are tapped on to the pipe 1. The pipes 2—3 are provided respectively, with hand valves 4—5 and are connected with a tank 6 having a closure cap 7 whereby it may be opened and closed. This tank holds a chemical reagent $6^a$ which is replaced at will from time to time when exhausted. The tank 6 is provided with a discharge valve 8 to facilitate the removal of any of the reagent contained in the tank 6 at any time desired, and also to facilitate the cleaning of this tank at intervals. At 9 is a reservoir which is provided at its bottom with a discharge valve 10. The reservoir is closed at its top, and connected with its top is a pipe 11 which leads to the bottom of a vessel 12. This vessel is closed and from its top a pipe 13 leads to the bottom of another vessel 14. The vessels 12—14 are provided with discharge valves $15^a$ and also with filters 18—19. Filtering materials 16—17 are placed within the vessels 12—14 for the purpose of cleansing the water as passed through these vessels under pressure. A pipe 20 is connected with the vessel 14 and may be continued any distance in order to discharge the purified water at any point desired. The reagent $6^a$ is introduced in the tank 6 while in a solid state and gradually dissolves in the water as the latter passes. The various hand valves 4, 5, 15 are used for the purpose of regulating the flow of the water, the flow through the main pipe being controllable mainly by the hand valve 15, whereas the flow through the tank 6 is controllable by the hand valves 4, 5. It will be noted that the lower ends of the pipes 1 and 3 are also arranged so that the water passing through the pipe 1 becomes thoroughly mixed with the water from the tank 6, the water last mentioned containing more or less of the reagent in solution. The proportion of the reagent delivered into the reservoir 9 may therefore be controlled within the proper limits at will.

The operation of my device is as follows: The parts being arranged as above described, the hand valves are properly adjusted and the work of the mechanism begins. The proportions of the various parts and the adjustment of the different valves are so controlled as to produce the complete precipitation of the calcareous salts or other foreign matters contained in the water, but without wasting any of the reagent. This is done by simply preventing excessive flow of the solution containing the reagent, into the reservoir 9. In order to determine with accuracy the precise adjustments necessary, small quantities of liquid from the reservoir 9 may be subjected to simple quantitative analysis.

It will be observed that the travel of the water charged with the reagents is very short. Any residue of foreign matter contained in the water is taken up by the filtering materials 16, 17 in the vessels 12, 14. These vessels, after a long time, require some attention, as the filtering materials 16, 17 should occasionally be renewed.

It will be observed that the pipe 1 opens into the reservoir 9 at approximately its vertical center. The installation is simplified by this arrangement in that the upper part of the reservoir is permitted to serve as a reaction vessel, while the lower part serves as a decanting vessel, the reservoir thus serving both purposes without any partitions.

The operation of the apparatus above described may be either intermittent or continuous.

Having thus described my invention, I claim as new and desire to secure by Letters Patent:—

1. An apparatus for the purifying of water comprising a supply pipe for the water under pressure, a closed vessel connected by a branch pipe with the said supply pipe and adapted to receive a solid reagent, inlet and outlet cocks on the said vessel, a cock on the pipe between the ends of the branch pipe, a closed reservoir, the said pipe opening substantially at the middle into the said reservoir, a closed filter, and a pipe connecting the top of the reservoir with the filter.

2. An apparatus of the character specified, comprising a reservoir having a conical bottom, and a valve controlled outlet in the bottom, a supply pipe opening into the reservoir at approximately its vertical center for the purpose specified, a vessel for containing a reagent communicating at its top and bottom with the said pipe, valves for controlling the communications, a valve in said pipe between the communications, a plurality of filters, a communication between the top of the reservoir and one of the filters, and a communication between the top of the said filter and the bottom of the other filter.

In testimony, that I claim the foregoing as my invention, I have signed my name in presence of two subscribing witnesses.

JULES PAUL LAJOIE.

Witnesses:
RAYMOND RENXOYSE,
MAURICE ROUX.